US012022326B2

(12) United States Patent
Nadkarni et al.

(10) Patent No.: US 12,022,326 B2
(45) Date of Patent: *Jun. 25, 2024

(54) POLICY ENFORCEMENT IN A 3GPP ENVIRONMENT WHILE ENSURING CONGESTION AVOIDANCE ON USER PLANE FUNCTION NORTHBOUND INTERFACES

(71) Applicant: Cisco Technology, Inc., San Jose, CA (US)

(72) Inventors: Milind Suresh Nadkarni, Pune (IN); Umesh Prabhakar Gaikwad, Maharashtra (IN); Sanjeev Panem Jaya, Maharashtra (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,703

(22) Filed: Jul. 21, 2023

(65) Prior Publication Data

US 2023/0362729 A1 Nov. 9, 2023

Related U.S. Application Data

(63) Continuation of application No. 17/538,587, filed on Nov. 30, 2021, now Pat. No. 11,765,621.

(51) Int. Cl.
*H04W 28/08* (2023.01)
*H04W 28/02* (2009.01)

(52) U.S. Cl.
CPC ... *H04W 28/0925* (2020.05); *H04W 28/0289* (2013.01)

(58) Field of Classification Search
CPC ......... H04M 15/8038; H04M 15/8044; H04M 15/8228; H04M 15/62; H04M 15/8027;
(Continued)

(56) References Cited

U.S. PATENT DOCUMENTS

| 8,219,663 B2 * | 7/2012 | Faraldo, II ............. H04L 41/00 709/224 |
| 10,061,424 B2 * | 8/2018 | Poornachandran ... G06F 1/1652 |

(Continued)

FOREIGN PATENT DOCUMENTS

| WO | 2020001795 A1 | 1/2020 |
| WO | 2020057763 A1 | 3/2020 |

OTHER PUBLICATIONS

International Search Report and Written Opinion for PCT Application No. PCT/US2022/080500, dated Feb. 15, 2023, 13 pages.
(Continued)

*Primary Examiner* — Mehmood B. Khan
(74) *Attorney, Agent, or Firm* — Polsinelli P.C.

(57) ABSTRACT

Systems and methods are provided for providing differential treatment to user traffic involving optimized reporting of start and stop traffic. The systems and method can include detecting, at a user plane function, an initiation of a type of traffic being performed at the user plane function, providing, by the user plane function, a start event trigger of the type of traffic detected by the user plane function to a session management function, and receiving, at the user plane function, a policy associated with the type of traffic from the session management function, the policy including instructions preventing submissions of subsequent event triggers to the session management function until an end of the type of traffic, the subsequent event triggers being associated with the type of traffic detected by the user plane function.

20 Claims, 9 Drawing Sheets

(58) Field of Classification Search
CPC ..... H04M 15/751; H04M 15/66; H04W 4/24; H04W 28/0289; H04W 28/0925; H04L 12/1407; H04L 41/5022; H04L 65/1066; H04L 65/1013

See application file for complete search history.

(56) References Cited

U.S. PATENT DOCUMENTS

| | | | | |
|---|---|---|---|---|
| 10,123,225 | B1* | 11/2018 | Jain | H04L 43/067 |
| 11,337,139 | B2* | 5/2022 | Foti | H04W 88/06 |
| 2012/0005356 | A1* | 1/2012 | Hellgren | H04L 63/20 709/229 |
| 2012/0246325 | A1* | 9/2012 | Pancorbo Marcos | H04L 43/00 709/227 |
| 2015/0236862 | A1 | 8/2015 | Castro Castro et al. | |
| 2016/0014635 | A1* | 1/2016 | Räsänen | H04W 76/00 370/230 |
| 2016/0112896 | A1* | 4/2016 | Karampatsis | H04W 28/0289 370/230.1 |
| 2019/0045385 | A1* | 2/2019 | Lu | H04M 15/60 |
| 2019/0174573 | A1 | 6/2019 | Velev et al. | |
| 2019/0253917 | A1* | 8/2019 | Dao | H04M 15/00 |
| 2019/0357301 | A1* | 11/2019 | Li | H04W 80/10 |
| 2020/0404739 | A1 | 12/2020 | Thiebaut et al. | |
| 2021/0068172 | A1 | 3/2021 | Jeong et al. | |
| 2021/0195554 | A1* | 6/2021 | Singh | H04W 60/04 |
| 2021/0219179 | A1 | 7/2021 | Narath et al. | |
| 2022/0141662 | A1* | 5/2022 | Liao | H04L 63/10 726/1 |
| 2023/0138587 | A1* | 5/2023 | Dao | H04L 12/14 370/329 |

OTHER PUBLICATIONS

"3rd Generation Partnership Project; Technical Specification Group Services and System Aspects," Procedures for the 5G System (5GS), Stage 2 (Release 16), Dec. 17, 2020, pp. 1-603.

"3rd Generation Partnership Project; Technical Specification Group Services and System Aspects," Policy and charging control framework for the 5G System (5GS), Stage 2 (Release 16), Dec. 17, 2020, pp. 1-119.

Fuencisla Garcia Azorero, et al., "Dynamic update of mute indication for Application Detection and Control," 3GPP Draft; C3-224340; Type CR; CR 0966; 5GS_PH1-CT, TEI17_DCAMP, TEI18, 3rd Generation Partnership Project (3GPP); Aug. 11, 2022.

* cited by examiner

POLICY ENFORCEMENT IN A 3GPP ENVIRONMENT WHILE ENSURING CONGESTION AVOIDANCE ON USER PLANE FUNCTION NORTHBOUND INTERFACES

TECHNICAL FIELD

The instant application is a Continuation of, and claims priority to, U.S. patent application Ser. No. 17/538,587 filed Nov. 30, 2021 entitled Policy Enforcement in a 3gpp Environment While Ensuring Congestion Avoidance on User Plane Function Northbound Interfaces, the contents of which are incorporated herein by reference in its entirety.

BACKGROUND

Wireless communications systems are deployed to provide various telecommunications and data services, including telephony, video, data, messaging, and broadcasts. A fifth-generation (5G) mobile standard calls for higher data transfer speeds, greater number of connections, and better coverage, among other improvements. The advantages offered by a 5G network can be leveraged by private industries that are driving the deployment of private networks, which may also be referred to as Standalone Non-public Networks (SNPNs) or Public Network Integrated Non-Public Networks (PNI-NPNs).

In some cases, a wireless device can be configured to operate on multiple wireless networks. For example, a wireless device can be configured to operate on a private network (e.g., an NPN) as well as a public network that is operated by a mobile network operator (MNO). In some examples, the wireless device may be configured to use different network identities that are associated with the different wireless networks. A wireless network can use the network identity associated with a wireless device to provide short message service (SMS) (e.g., text messages) to the wireless device.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1A:
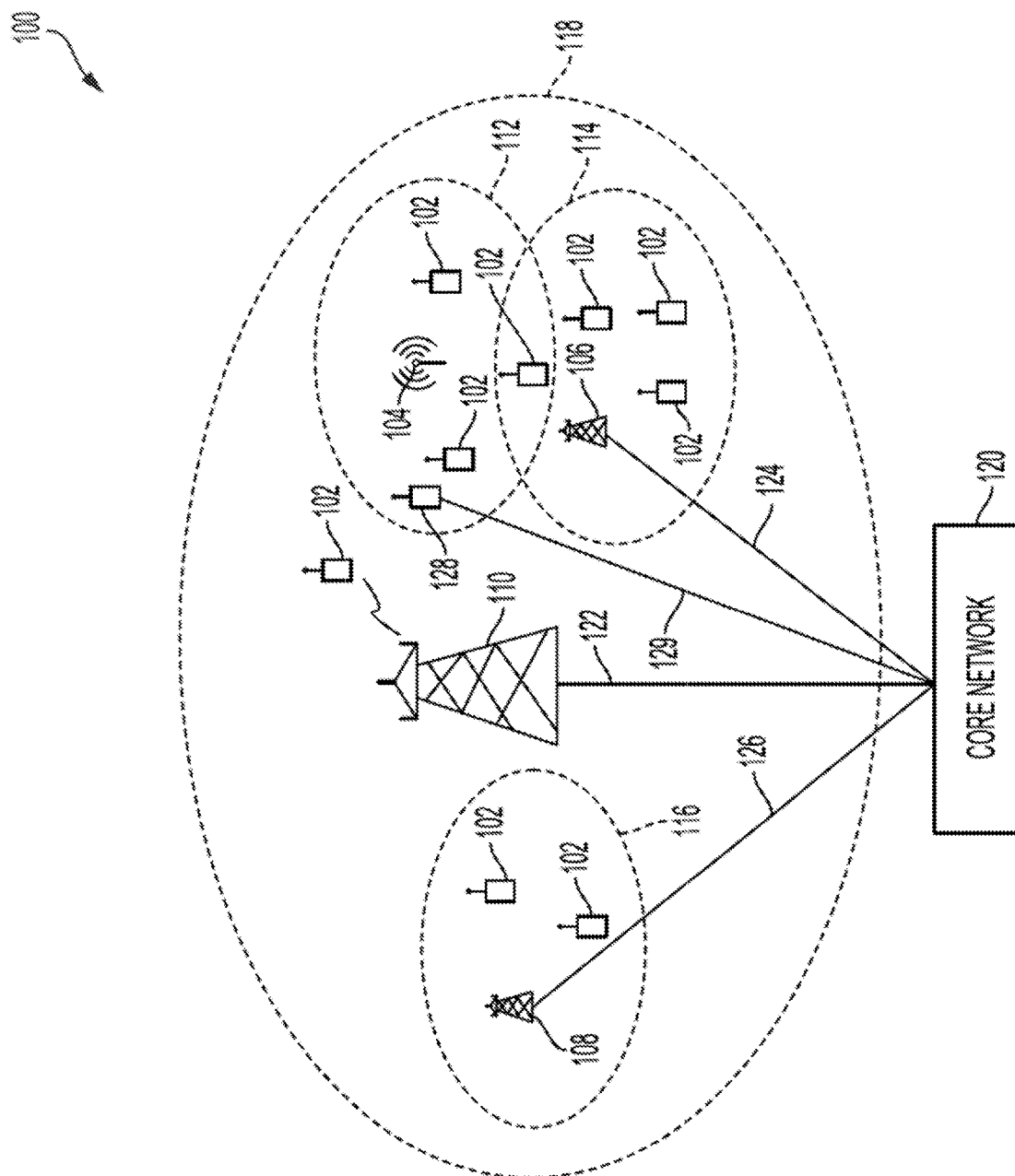
FIG. 1A illustrates an example network architecture, in accordance with an embodiment of the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods are provided for providing differential treatment to user traffic involving optimized reporting of start and stop traffic. For example, the systems and method can include detecting, at a user plane function, an initiation of a type of traffic being performed at the user plane function, providing, by the user plane function, a start event trigger of the type of traffic detected by the user plane function to a session management function, and receiving, at the user plane function, a policy associated with the type of traffic from the session management function, the policy including instructions preventing submissions of subsequent event triggers to the session management function until an end of the type of traffic, the subsequent event triggers being associated with the type of traffic detected by the user plane function.

Example Embodiments

A wireless device can include devices such as a mobile phone, router, tablet computer, laptop computer, consumer asset tracking device, wearable device (e.g., a smart watch, glasses, an XR device, etc.), Internet of Things (IoT) device, a vehicle (or a computing device of a vehicle), and/or another device used by a user to communicate over a wireless communications network. In some instances, a wireless device can be referred to as user equipment (UE), such as when referring to a wireless device configured to communicate using 5G/New Radio (NR) or other telecommunications standard.

In some cases, a wireless device be configured to operate on a private network as well as a public network (e.g., a network operated by a mobile network operator (MNO)). For example, the wireless device can have different network identities that can be used to associate with each corresponding network. Messages (e.g., SMS messages) that are directed to the wireless device using one of its network identities may be lost or delayed if the wireless device is not registered to the corresponding network. For example, if a message is sent to the network identity that the wireless device uses to associate with a private enterprise network, the message will not be delivered if the wireless device is registered to a public network (e.g., the message cannot be delivered because the device is not connected to the private network). Similarly, if a message is sent to the network identity that the wireless device uses to associate with a public network, the message will not be delivered if the wireless device is registered to a private network (e.g., the message cannot be delivered because the device is not connected to the public network).

Figure 1B:
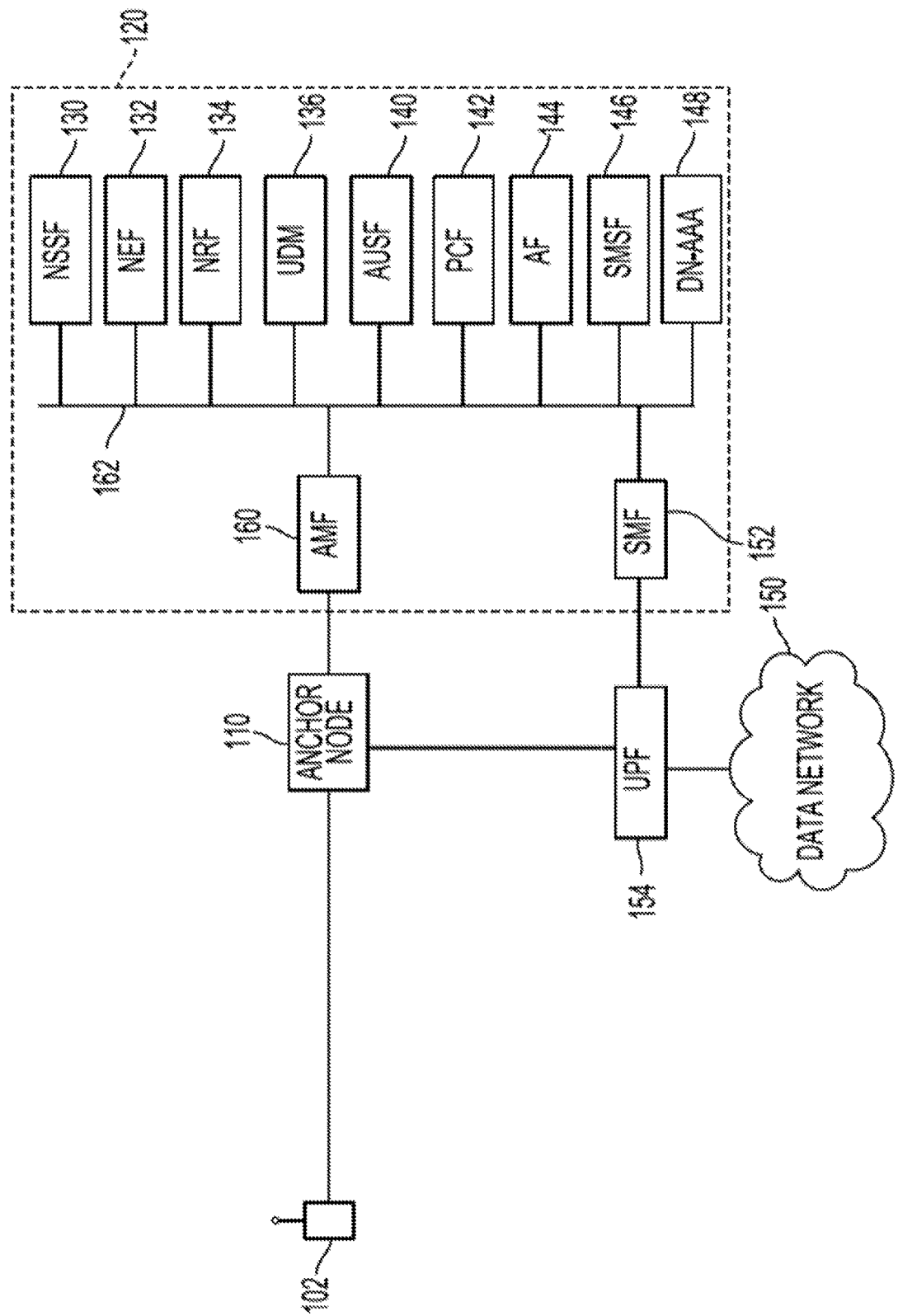
FIG. 1B illustrates an example network architecture, in accordance with an embodiment of the present disclosure.

FIGS. 1A and 1B illustrate an example of network architecture and associated components, according to an aspect of the present disclosure. As shown in FIG. 1A, network 100 is a 5G wireless communication network. Network 100 can include a number of user equipment (UE) 102. UEs 102 can be any type of known or to be developed device capable of establishing communication over a wireless/radio access technology with other devices. Examples of UEs 102 include, but are not limited to, various types of known or to be developed smart phones, laptops, tablets, desktop computers, Internet of Things (IoT) devices, etc.

UEs 102 can have multiple different radio access technology (RAT) interfaces to establish a wireless communication session with one or more different types of base stations (nodes) that operate using different RATs with network 100. For example, a UE 102 can have a 5G interface as well as a 4G interface. Therefore, such UE 102 can be, from time to time and as the need may arise, be handed over from a 5G network to a neighboring 4G network and vice-versa.

Network 100 may also include nodes 104, 106, 108 and 110. Nodes 104, 106, 108 and 110 can also be referred to as base stations or access points 104, 106, 108 and 110. For example, node 104 can be a WiFi router or access point providing a small cell site or coverage area 112 for several of the UEs 102 therein. Therefore, node 104 may be referred to as a small cell node. Nodes 106 and 108 can be any one of various types of known or to be developed base stations providing one or more different types of Radio Access Networks (RANs) to devices connecting thereto. Examples of different RANs include, but are not limited to, Global System for Mobile Communication (GSM), General Packet Radio Service (GPRS)/Enhanced Data Rates for GSM Evolution (EDGE), Universal Mobile Telecommunications System (UMTS), Long-Term Evolution (LTE), LTE-advanced, Worldwide Interoperability for Microwave Access (WiMAX), WiFi, Code Division Multiple Access (CDMA), Evolution-Data Optimized (EV-DO), IS-95 etc.

Node 106 can provide coverage area 114 for end points 102 within coverage area 114. As shown in FIG. 1A, one or more UEs 102 can be located on an overlapping portion of coverage areas 112 and 114. Therefore, such one or more UEs 102 can communicate with node 104 or node 106.

Furthermore, node 108 can provide coverage area 116 for some of UEs 102 in coverage area 116. Node 110 can provide coverage area 118 for all UEs 102 shown in FIG. 1A.

Within the 5G structure of network 100, nodes 104, 106, 108 and 110 may operate in a connected manner to expand the coverage area provide by node 110 and/or to serve more UEs 102 than node 110 or some of the nodes 104, 106, 108 and 110 can handle individually. Node 104 may be communicatively coupled to node 106, which may in turn be communicatively coupled to node 110. Similarly, node 108 can be communicatively coupled to node 106 and/or node 110. Node 104 and node 106 can communicate with node 110 via any known or to be developed wireless communication standard. Also, node 108 can communicate with node 110 via any known or to be developed wireless communication standard.

Within network 100, node 110 can have a wired connection to core network 120 via, for example, fiber optics cables. This may be referred to as backhaul 122 or backhaul connection 122. While fiber optic cables are an example of a connection medium for backhaul 122, the present disclosure is not limited thereto and the wired connection can be any other type of know or to be developed wire.

Furthermore, each of nodes 106, 108 and 110 can include any type of base station such as a next generation or 5G e-NodeB, which may also be referred to a global NodeB (gNB). Each of nodes 106 and 108 can have separate backhaul connections 124 and 126 to core network 120. Connections 124 and 126 can be the same as backhaul connection 122. In an example, where node 104 is a WiFi node, node 104 can connect to Core network 122 via a node 128, which can be a N3 Interworking Function (N3IWF) node. Connection 129 between node 128 and Core network 120 can be the same as backhaul connection 122.

FIG. 1B illustrates another example architecture with components of core network 120 of FIG. 1A, according to an aspect of the present disclosure. A simplified version of network 100 is shown in FIG. 1B, where a single UE 102 has a wireless communication session established with base station 110. Base station 110 is in turn connected to core network 120 via backhaul 122.

Furthermore, FIG. 1B illustrates example logical components of core network 120. Example components/nodes of core network 120 include various network functions implemented via one or more dedicated and/or distributed servers (can be cloud based). Core network 120 of 5G network 100 can be highly flexible, modular and scalable. It can include many functions including network slicing. It offers distributed cloud-based functionalities, Network functions virtualization (NFV) and Software Defined Networking (SDN).

For example, core network 120 can include Application and Mobility Management Function (AMF) 160, with which base station 110 communicates (e.g., using an N2 interface). Core network 120 further has a bus 162 connecting various servers providing different example functionalities. For example, bus 162 can connect AMF 160 to Network Slice Selection Function (NSSF) 130, Network Exposure Function (NEF) 132, Network Repository Function (NRF) 134, Unified Data Management (UDM) 136, Authentication Server Function (AUSF) 140, Policy Control Function (PCF) 142, Application Function (AF) 144, Short Message Service Function (SMSF) 146, Data Network Authentication, Authorization, and Accounting (DN-AAA) 148 function/server, and Session Management Function (SMF) 152. In some aspects, one or more of the functions or components illustrated may be outside of core network 120 (e.g., DN-AAA 148 can be outside core network 120).

In one example, a node serving as SMF 152 may also function as a control plane Packet Gateway (PGW-C) node. Various components of core network 120, examples of which are described above, provide known or to be developed functionalities for operation of 5G networks including, but not limited to, device registration, attachment and authentication, implementing network policies, billing policies, etc.

Furthermore, as shown in FIG. 1B, SMF 152 is connected to User Plane Function (UPF) 154, which in turns connects core network 120 and/or UE 102 (after authentication and registration with core network 120) to data network (DN) 150. In one example, a node serving as UPF 154 may also function as a user plane Packet Gateway (PGW-C) node and/or a user place Serving Gateway (SGW-U) node.

While FIG. 1B illustrates an example structure and components of core network 120, the present disclosure is not limited thereto. Core network 120 can include any other number of known or to be developed logical functions and components and/or can have other known or to be developed architecture.

For purposes of illustration and discussion, network 100 has been described with reference to a limited number of UEs 102, nodes 104, 106, 108, 110, etc. However, inventive concepts are not limited thereto.

Furthermore, while certain components have been illustrated and described with reference to FIGS. 1A and 1i, network 100 can include any other known or to be developed elements or components for its operation.

In Control Plane and User Plane Separation ("CUPS") architecture, traffic handling and usage counting can occur at user plane function (UPF), and usage can be relayed to a session management function (SMF) by the UPF pursuant to usage reporting rules (URR). The URR usage can also be relayed by the SMF to a charging function ("CHF"). The SMF can initially generate URRs and associate them with a packet detection rule (PDR). Traffic can then be processed under the PDR and its usage accounted for via the URR at the UPF.

Figure 2:
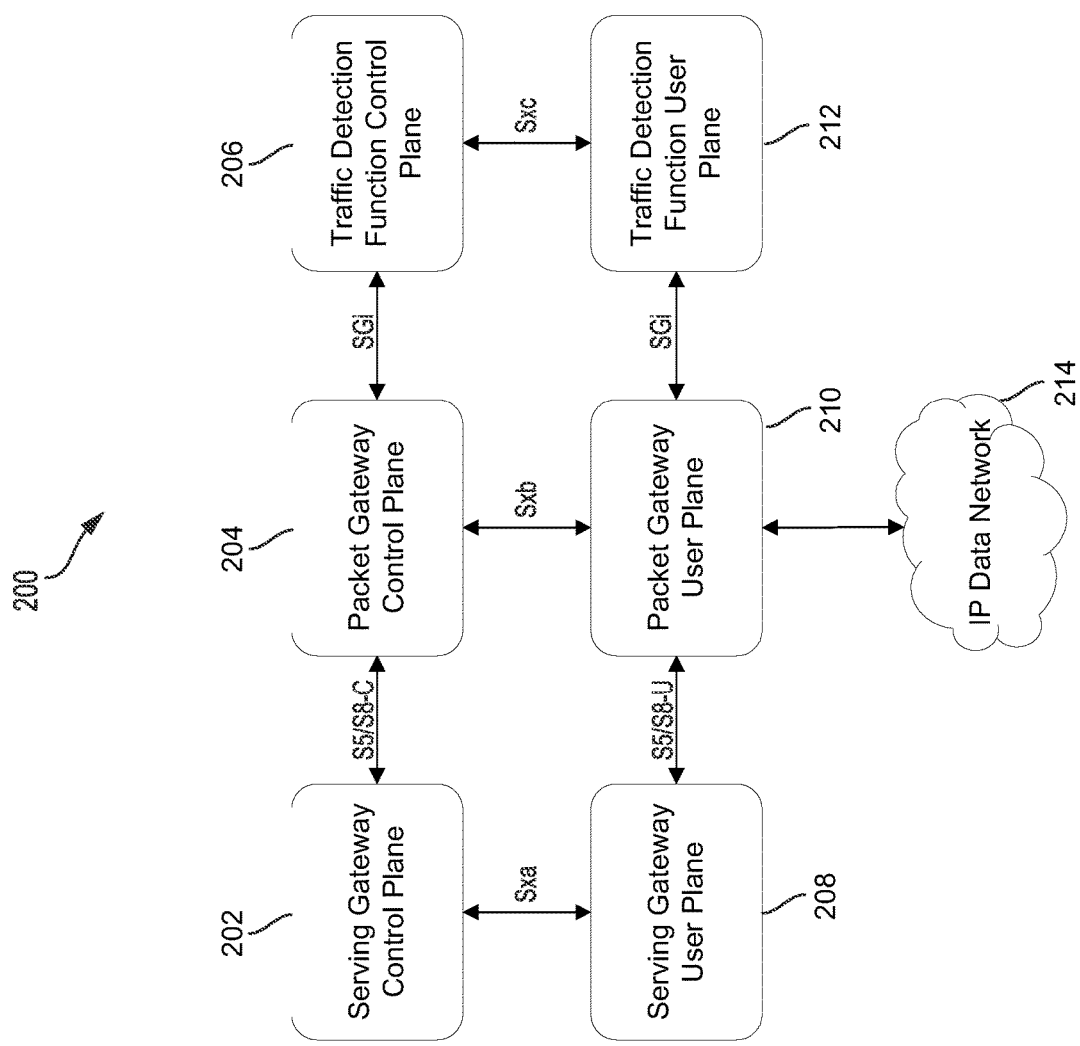
FIG. 2 illustrates an example Control and User Plane Separation network architecture, in accordance with some embodiments.

FIG. 2 illustrates an example Control and User Plane Separation (CUPS) network architecture 200, in accordance with some embodiments. The CUPS network architecture 200 can include a serving gateway control plane ("SGW-C") 202, a packet gateway control plane ("PGW-C") 204, a traffic detection function control plane ("TDF-C") 206, a serving gateway user plane ("SGW-U") 208, a packet gateway user plane ("PGW-U") 210, a traffic detection function user plane ("TDF-U") 212, and an IP data network 214.

The CUPS network architecture 200 can allow mobile operators to separate the control plane and user plane of their network (e.g., Evolved Packet Core (EPC)). This capability can deliver the ability to scale each network plane independent of one another, promoting a more cost-effective approach to core mobile architecture, and future-proofing the network for 5G. With CUPS for ultra services platform (USP), an existing serving gateway ("SGW"), packet gateway ("PGW"), and serving architecture evolution gateway ("SAEGW") can be separated into SGW-C, PGW-C, and SAEGW-C for the control plane and SGW-U, PGW-U, and SAE-GWU for the user plane. The CUPS network architecture 200 can include features such as: independent scalability of the control and user planes; ability to specialize the user plane for key applications; 5G readiness; lower backhaul costs; traffic offload; new use-case enablement; and multi-level CUPS offerings.

In some implementations, the CUPS network architecture 200 can include various interfaces that connect the control planes and the user planes. For example, the SGW-C 202 can be connected to the PGW-C 204 via an S5/S8-C interface. The PGW-C 204 can be connected to the TDF-C 206 via an SGi interface. The TDF-C 206 can be connected to the TDF-U 212 via an Sxc interface. The TDF-U 212 can be connected to the PGW-U 210 via an SGi interface. The PGW-U 210 can be connected to the SGW-U 208 via an S5/S8-U interface, the PGW-U 210 can be connected to the PGW-C 204 via an Sxb interface, and the SGW-U 208 can be connected to the SGW-C 202 via an Sxa interface.

Figure 3:
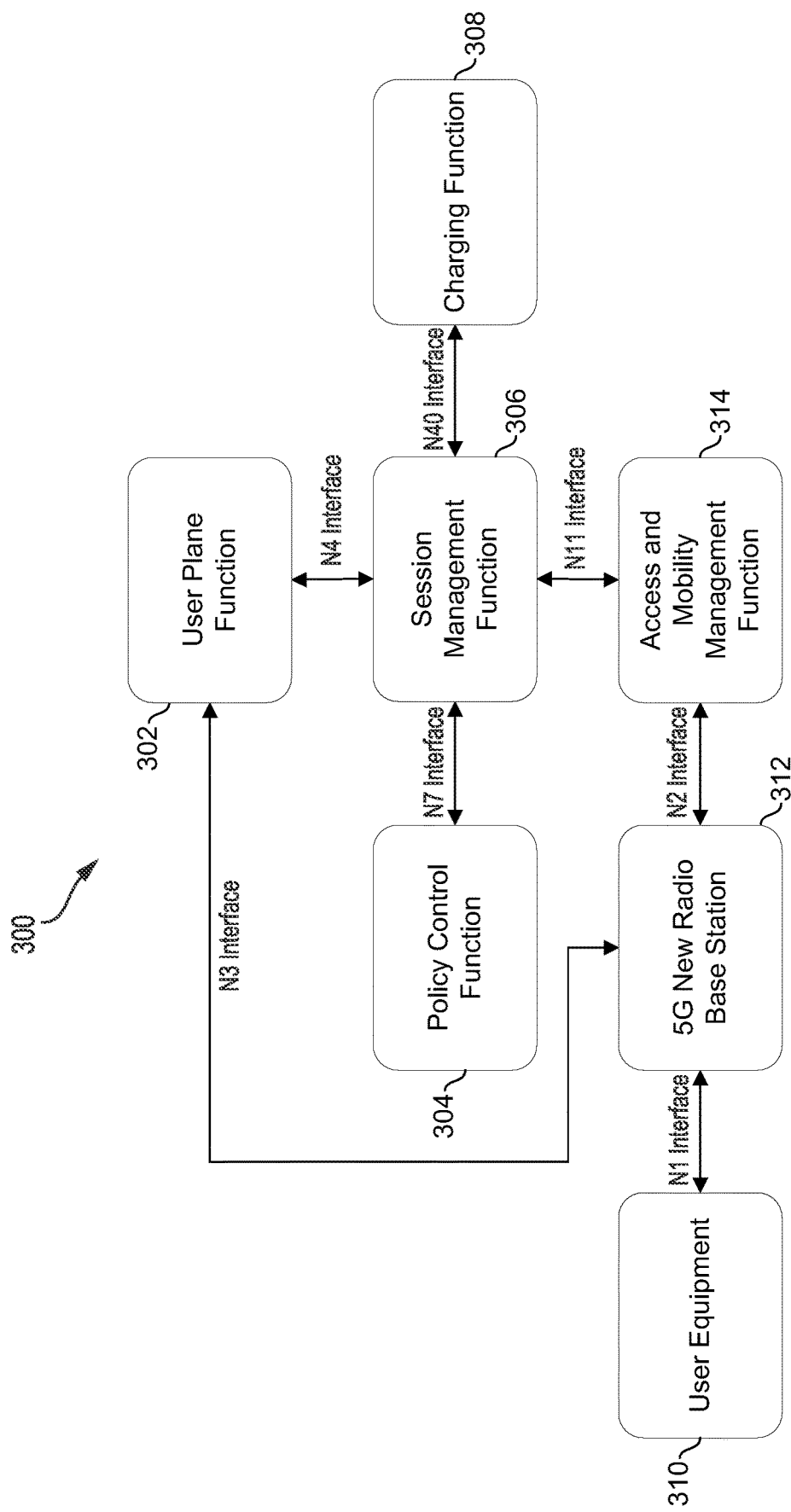
FIG. 3 illustrates an example Control and User Plane Separation network architecture, in accordance with some embodiments.

FIG. 3 illustrates an example Control and User Plane Separation (CUPS) network architecture 300, in accordance with some embodiments. The CUPS network architecture 300 can include a user plane function (UPF) 302, a policy control function (PCF) 304, a session management function (SMF) 306, a charging function ("CHF") 308, a user equipment (UE) 310, a 5G new radio base station ("gNB") 312, and an access and mobility management function ("AMF") 314.

In some implementations, The UPF 302 can be connected to the SMF 306 via an N4 interface. The PCF 304 can be connected to the SMF 306 via an N7 interface. The SMF 306 can be connected to the CIF 308 via an N40 interface. The SMF 306 can be connected to the AMF 314 via an N11 interface. The AMF 314 can be connected to the gNB 312 via an N2 interface. The gNB 312 can be connected to the UE 310 via an N1 interface. The UPF 302 can be connected to the gNB 312 via an N3 interface.

In other implementations, the CUPS network architecture 300 can utilize a customized feature. Initially, the CUPS network architecture 300 can include the SMF 306 and the UPF 302 exchanging information regarding existing supported features that may be facilitated by a node level message exchange between the SMF 306 and the UPF 302. The node level messages can include information relating to information elements (IE) such as a control plane (CP) 306 (e.g., the session management function 306) and a user plane (UP) 302 (e.g., the user plane function 302) supported features. For example, the node level messages can include a bit map and node advertisements if the feature is supported by the node.

The CUPS network architecture 300 can provide an operator with control to achieve charging services for offline when there is no time or volume reporting that is required. In absence of this, if the operator wants usage information in a CC event, a URR Deletion, or Call Deletion, the operator would have to provide a mandatory configuration with volume/time limits. The CUPS network architecture 300 provides the added benefit where an operator is not interested in receiving timely reports, but rather, is expected to receive a report when a charging event occurs, when a charging service is removed, or when a call is deleted. The CUPS network architecture 300 can lower congestion and CPU overhead.

A UPF may need a URR (e.g., per rating group (RG)/svcID bucket) to count for RG/svcid usage. Previous configurations may not allow generation of an offline URR without a volume or time threshold trigger for periodic reporting. There would be many instances where an operator is not interested in periodic volume or time based reporting, but rather, the operator would like to receive usage data per RAT type or location. For example, short audio calls such as calls to an automated helpline, etc.; and Internet-of-Things (IoT) devices such as connected cars where data volume is not significant but UE mobility and differential charging based on RAT type/PLMN may be needed.

In other implementations, the CUPS network architecture 300 may not add a new message or IE at a per session level to increase the traffic/chattiness on the N4 interface. The CUPS network architecture 300 can generate a URR at the UPF 302 without any volume/time thresholds, thereby reducing messages across the N4 interface. In some examples, the UPF 302 may need URR buckets to be generated per RG and service ID. The UPF 302 may not be able to generate a default bucket on its own without the SMF 306 on the N4 interface since RG and service ID may not be known to the UPF 302, which is known by the SMF 306 and the CHF 308.

Currently, polices that drive operator use cases on 5G/EPC (e.g., 4G/LTE) networks are installed by a PCF over an N7 interface (e.g., within a 5G network) or a policy and charging rules function (PCRF) over a Gx interface (e.g., within a 4G/LTE network). These policy installations or uninstallations are triggered when a start or end of a specified type of traffic (e.g., video, music, social sites, etc.) is detected.

Figure 4:
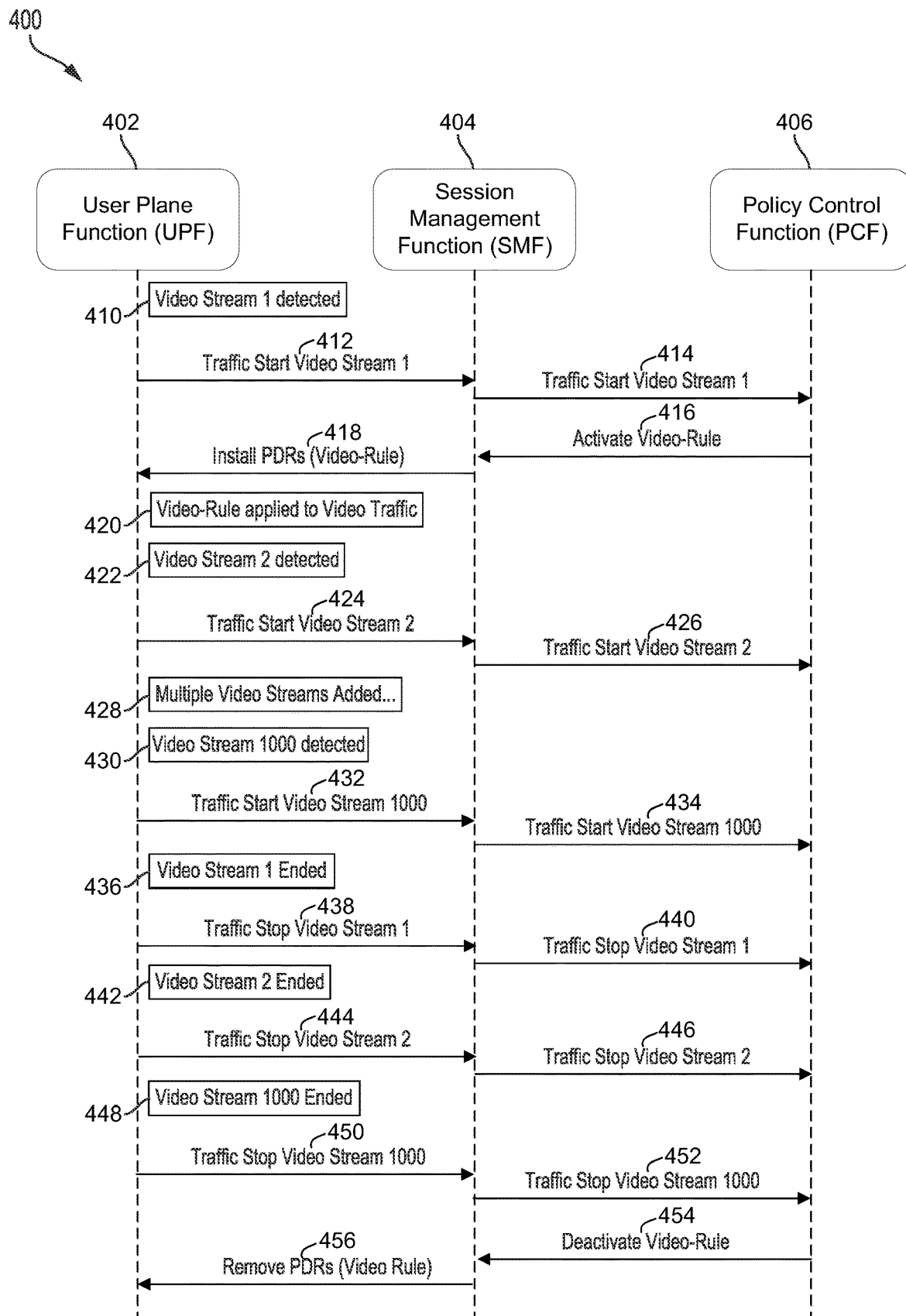
FIG. 4 illustrates an example sequence diagram of a process for providing application start and stop trigger events, in accordance with some embodiments.

For example, when a UPF/user plane (UP) detects a specified type of traffic (e.g., an application type that may be identified by an application identification ("AppId")), the UPF/UP may report relevant application information to the SMF/CP, which in turn propagates the start/stop of traffic to the PCF/PCRF, as shown in FIG. 4.

The problem with this type of framework is that the start/stop of traffic is triggered upon the detection of every stream of traffic corresponding to the AppId. In the event of a large number of concurrent streams that are matched to the AppId, a start/stop event trigger is generated for each and every stream, such that the streams result in the congestion of the N4/Sx and N7/Gx interfaces. This type of framework also results in the overloading of SMF and PCF nodes due to processing of all the events. Moreover, in event of a UPF/UP failure, information relating to all the start event triggers (e.g., APP_START) will be significantly large and will be required to be restored in order to be able to send stop event triggers (APP-STOP) post recovery.

As such, a need exists to provide a system that can optimize the above-mentioned signaling over N7/Gx and N4/Sx interfaces for wireless networks. The present disclosure can provide significant reduction in transactions across the N7/Gx interfaces as well as the N4/Sx interfaces, while supporting an operator's business cases.

The present technology provides systems and method that can include detecting, at a user plane function, an initiation of a type of traffic being performed at the user plane function, providing, by the user plane function, a start event trigger of the type of traffic detected by the user plane function to a session management function, and receiving, at the user plane function, a policy associated with the type of traffic from the session management function, the policy including instructions preventing submissions of subsequent event triggers to the session management function until an end of the type of traffic, the subsequent event triggers being associated with the type of traffic detected by the user plane function.

As further described below, the disclosed technology provides systems, methods, and computer-readable media for providing differential treatment to user traffic involving optimized reporting of start and stop traffic. Examples will be described herein using 5G/New Radio (NR) as an illustrative example. However, the systems and techniques are not limited to 5G and can be implemented using other wireless technologies such as next generation 6G networks and 4G Control and User Plane Separation (CUPS) architecture between SGWC-U and PGWC-U, as described herein. The present technology will be described in the subsequent disclosure as follows.

FIG. 4 illustrates an example sequence diagram of a process for providing application start and stop trigger events 400, in accordance with some embodiments. The CUPS network architecture can include a user plane function (UPF) 402, a session management function (SMF) 404, and a policy control function (PCF) 406.

At step 410, the process 400 can include the UPF 402 detecting a video stream 1.

At step 412, the process 400 can include the UPF 402 providing a start trigger event (e.g., traffic start video stream 1) to the SMF 404.

At step 414, the process 400 can include the SMF 404 providing the start trigger event (e.g., traffic start video stream 1) to the PCF 406.

At step 416, the process 400 can include the PCF 406 providing a policy (e.g., activate video-rule) to the SMF 404.

At step 418, the process 400 can include the SMF 404 installing the policy and providing a packet detection rule (PDR) (e.g., install video-rule) to the UPF 402, to be installed by the UPF 402.

At step 420, the process 400 can include the UPF 402 applying the video-rule (e.g., PDF) to video traffic.

At step 422, the process 400 can include the UPF 402 detecting a video stream (e.g., video stream 2).

At step 424, the process 400 can include the UPF 402 providing a start trigger event (e.g., traffic start video stream 2) to the SMF 404.

At step 426, the process 400 can include the SMF 404 providing the start trigger event (e.g., traffic start video stream 2) to the PCF 406.

At step 428, the process 400 can include the UPF 402 adding multiple video streams to a queue for viewing.

At step 430, the process 400 can include the UPF 402 detecting a video stream (e.g., video stream 1000).

At step 432, the process 400 can include the UPF 402 providing a start trigger event (e.g., traffic start video stream 1000) to the SMF 404.

At step 434, the process 400 can include the SMF 404 providing the start trigger event (e.g., traffic start video stream 1000) to the PCF 406.

At step 436, the process 400 can include the UPF 402 detecting an ending of a video stream (e.g., video stream 1).

At step 438, the process 400 can include the UPF 402 providing a stop trigger event (e.g., traffic stop video stream 1) to the SMF 404.

At step 440, the process 400 can include the SMF 404 providing the stop trigger event (e.g., traffic stop video stream 1) to the PCF 406.

At step 442, the process 400 can include the UPF 402 detecting an ending of a video stream (e.g., video stream 2).

At step 444, the process 400 can include the UPF 402 providing a stop trigger event (e.g., traffic stop video stream 2) to the SMF 404.

At step 446, the process 400 can include the SMF 404 providing the stop trigger event (e.g., traffic stop video stream 2) to the PCF 406.

At step 448, the process 400 can include the UPF 402 detecting an ending of a video stream (e.g., video stream 1000).

At step 450, the process 400 can include the UPF 402 providing a stop trigger event (e.g., traffic stop video stream 1000) to the SMF 404.

At step 452, the process 400 can include the SMF 404 providing the stop trigger event (e.g., traffic stop video stream 1000) to the PCF 406.

At step 454, the process 400 can include the PCF 406 providing a policy (e.g., deactivate video-rule) to the SMF 404.

At step 456, the process 400 can include the SMF 404 installing the policy and providing a PDR (e.g., remove video-rule) to the UPF 402, to be removed by the UPF 402.

In some implementations, the process 400 can support such use cases including providing differential treatment to user traffic, which may require the UPF 402/UP to inform the SMF 404/CP of the start of traffic including traffic type information (e.g., Application Identifier). This start of traffic information can then be passed over an N7/Gx interface to the PCF 406/PCRF.

In some examples, the PCF 406/PCRF, depending on policies configured for treating received traffic types, can then install such policies on the SMF 404/CP. These installed policies are then pushed to the UPF 402/UP in the form of PDRs, and subsequently, the policies defined in these PDRs can be applied to specified user traffic (e.g., video streams 1, 2, 1000, etc.).

Some of an operator's use cases may be contingent on the treatment of certain types of traffic on a subscriber session. For example, once a traffic type is found to have started on the subscriber session, the PCF 406/PCRF can install a policy to treat the specified traffic type. Moreover, once a traffic type is found to have ceased on the subscriber session, the PCF 406/PCRF can uninstall an associated policy to stop treating the specified traffic type, after receiving a stop event trigger (e.g., APP-STOP).

However, all subsequent streams of the same traffic type (e.g., including the same Application Id) can continue triggering a set of start and stop event triggers of traffic over northbound interfaces as described herein. As such, as illustrated in FIG. 4, supporting video traffic treatment by installing and uninstalling of video-rule policies, for a large number of transactions/streams, congests N7/Gx and N4/Sx interfaces. With an increasing diversity of traffic and an adoption of new protocols such as quick UDP internet connections ("QUIC"), which uses multiple streams to transfer data results at a high transaction rate between multiple nodes, UPF 402/UP northbound interfaces become congested very quickly.

As such, a need exists to provide a system that can optimize the above-mentioned signaling over N7/Gx and N4/Sx interfaces for wireless networks. The present disclosure can provide significant reduction in transactions across the N7/Gx interfaces as well as the N4/Sx interfaces, while supporting an operator's business cases.

Figure 5:
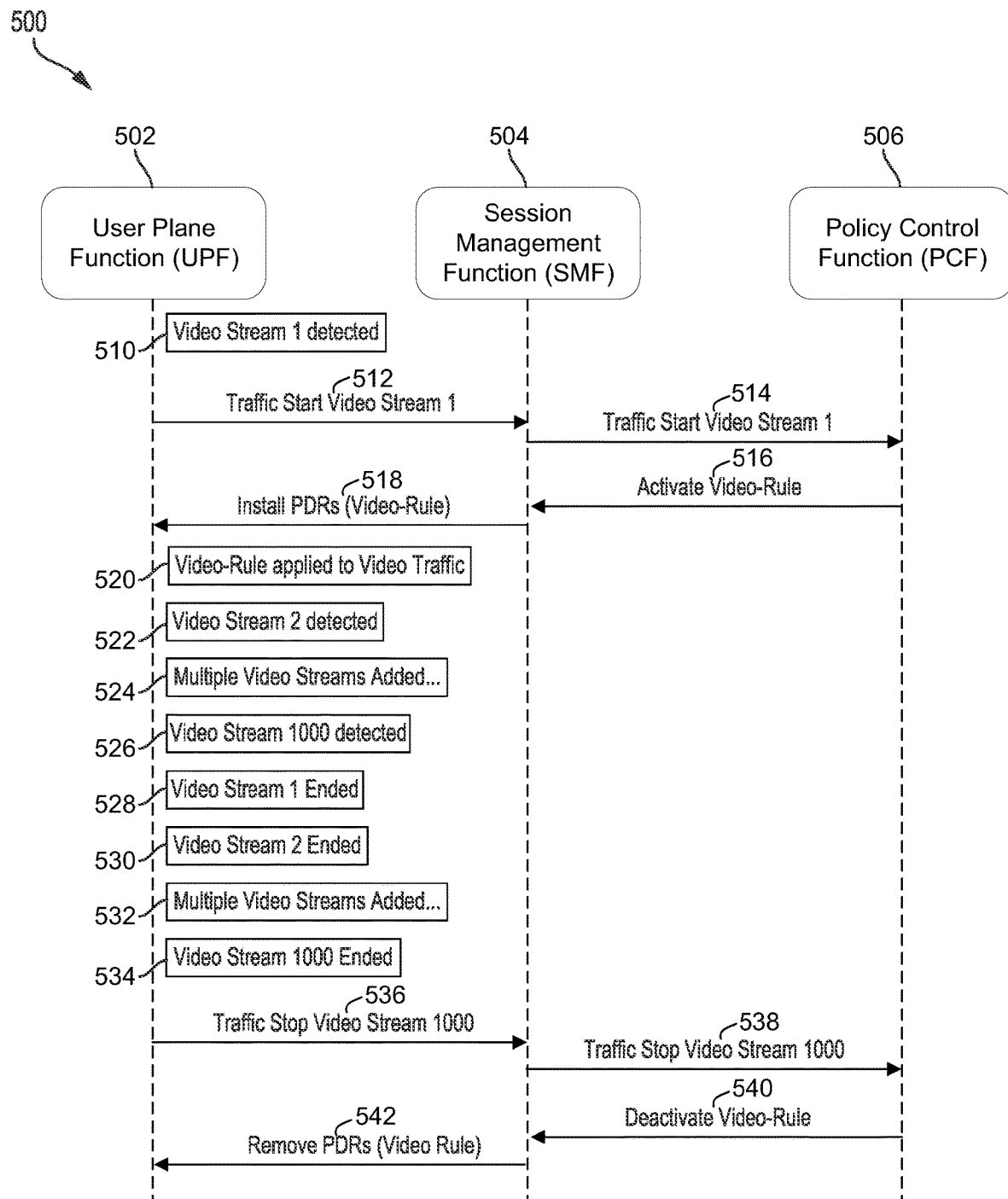
FIG. 5 illustrates an example sequence diagram of a process for providing differential treatment to user traffic involving optimized reporting of start and stop traffic, in accordance with some embodiments.

FIG. 5 illustrates an example sequence diagram of a process for providing differential treatment to user traffic involving optimized reporting of start and stop traffic 500, in accordance with some embodiments. The CUPS network architecture can include a user plane function (UPF) 502, a session management function (SMF) 504, and a policy control function (PCF) 506.

At step 510, the process 500 can include the UPF 502 detecting a video stream 1.

At step 512, the process 500 can include the UPF 502 providing a start trigger event (e.g., traffic start video stream 1) to the SMF 504.

At step 514, the process 500 can include the SMF 504 providing the start trigger event (e.g., traffic start video stream 1) to the PCF 506.

At step 516, the process 500 can include the PCF 506 providing a policy (e.g., activate video-rule) to the SMF 504.

At step 518, the process 500 can include the SMF 504 installing the policy and providing a packet detection rule (PDR) (e.g., install video-rule) to the UPF 502, to be installed by the UPF 502.

At step 520, the process 500 can include the UPF 502 applying the video-rule (e.g., PDF) to video traffic.

At step 522, the process 500 can include the UPF 502 detecting a video stream (e.g., video stream 2).

At step 524, the process 500 can include the UPF 502 adding multiple video streams to a queue for viewing.

At step 526, the process 500 can include the UPF 502 detecting a video stream (e.g., video stream 1000).

At step 528, the process 500 can include the UPF 502 detecting an ending of a video stream (e.g., video stream 1).

At step 530, the process 500 can include the UPF 502 detecting an ending of a video stream (e.g., video stream 2).

At step 532, the process 500 can include the UPF 502 adding multiple video streams to a queue for viewing.

At step 534, the process 500 can include the UPF 502 detecting an ending of a video stream (e.g., video stream 1000).

At step 536, the process 500 can include the UPF 502 providing a stop trigger event (e.g., traffic stop video stream 1000) to the SMF 504.

At step 538, the process 500 can include the SMF 504 providing the stop trigger event (e.g., traffic stop video stream 1000) to the PCF 506.

At step 540, the process 500 can include the PCF 506 providing a policy (e.g., deactivate video-rule) to the SMF 504.

At step 542, the process 500 can include the SMF 504 installing the policy and providing a PDR (e.g., remove video-rule) to the UPF 502, to be removed by the UPF 502.

In some implementations, a CUPS gateway system can utilize the process 500 in a 5GC/EPC network system. For example, some nodes can be converted into control plane (CP) nodes and/or user plane (UP) nodes in an architecture enhancement (e.g., 3GPP R14). In some examples, N4/Sx can be an interface between the control plane and user plane nodes.

Policies received from PCF 506/PCRF can be converted into Packet Detection Rule (PDR), Forwarding Action Rule (FAR), Usage Reporting Rule (URR), QoS Enhancement Rule (QER), or Buffering Action Rule (BAR), and provided to the UPF 502/UP over an N4/Sx interface, as shown in FIG. 5. The PCF 506/PCRF can also have these types of policies be installed at the SMF 504 or UPF 502. These types of policies may be driven by business cases that may need differential treatment to be provided by the UPF 502/UP for specified types of traffic or applications including, but not limited to, video streams, audio streams, gaming, connected cars, IOT, URLLC application, tele-medicine, etc.

In other implementations, once a traffic type is detected by the UPF 502, the number of transactions on an N7/Gx interface, as well as an N4/Sx interface, increases significantly for the UPF 502 to receive corresponding policies and to apply differential treatment of the detected traffic types. With the exponential rise in user traffic, as well as the multitude of business cases that drive the need for differential treatment of traffic as described herein, the overhead on the interface capacity can be significant and lead to congestion of the N7/Gx and N4/Sx northbound interfaces of the wireless network.

As the average usage per subscriber increases and more applications/content are being launched by content providers, operators are continuously looking for ways to monetize their network deployments. For example, operators can offer personalized services or apply differential treatment (e.g., in terms of policies or charges) to different types of traffic.

In some implementations, the present disclosure (e.g., process 500) satisfies this need by providing the ability to dynamically install different policies for the subscriber (e.g., UPF 502) when a specified application is detected. In one example, process 500 can include enabling "Application Detection Rules" and having the PCF 506/PCRF subscribe to event triggers such as "APP-START & APP-STOP" trigger events. Process 500 can increase the number of transactions and traction rate between the UPF 502/UP and SMF 504/SAEGW-C, and the SMF 504/SAEGW-C and the PCF 506/PCRF.

The process 500 can provide a mechanism for providing differential treatment to user traffic involving optimized reporting of start and stop traffic, rather than "muting" application start/stop notifications from the UPF 502/UP. Generally muting these types of notifications can break an operator's use case if differential policies are applied for different types of applications or categories of applications.

In some implementations, the process 500 can provide a mechanism for an operator to continue to offer differential treatment for different applications or traffic types, while significantly reducing the interactions between the UPF 502/UP and the SMF 504/SAEGW-C, and the SMF 504/SAEGW-C and the PCF 506/PCRF.

In other implementations, the process 500 can include providing differential treatment to user traffic by involving optimized reporting of start and stop traffic. For example, process 500 can include providing traffic start information upon detection of a first stream (e.g., step 512 of process 500) of a specified type of traffic (e.g., Application Id) to the SMF 504/CP. The SMF 504/CP can then propagate the start of the traffic (e.g., Application Id) to the PCF 506/PCRF (e.g., step 514 of process 500).

Upon receipt of a message, by the PCF 506/PCRF, that a certain type of traffic has commenced on the subscriber session (e.g., UPF 502) (e.g., step 514 of process 500), the PCF 506/PCRF can initiate installation of a corresponding policy to treat the reported stream type (e.g., traffic start video stream 1) at the UPF 502. For example, the corresponding policy can instruct the UPF 502 (e.g., steps 516, 518 of process 500) to prohibit providing additional start event triggers (e.g., an APP_START trigger) for subsequent streams of the same type (e.g., video stream). In some examples, the subsequent streams of data can continue to be treated with the installed policy for streams with the same Application Id (e.g., steps 520-532 of process 500).

In other implementations, when the UPF 502/UP determines that the last stream of the traffic type (e.g., Application Id, video stream, step 534 of process 500) has ended, the UPF 502/UP can report the stop of traffic to the SMF 504/CP (e.g., step 536 of process 500). Thereafter, the SMF 504/CP can propagate the stop of traffic (e.g., Application Id, stop event trigger) to the PCF 506/PCRF (e.g., step 538 of process 500).

After receiving information from the SMF 504/CP that traffic has ended or stopped for the Application Id on the subscriber session (e.g., UPF 502/UP), the PCF 506/PCRF can determine to uninstall the associated policy, pursuant to steps 516, 518 of process 500. In some examples, this type of optimization may be enabled directly on the UPF 502/UP via configuration for all or specified Application Detection Rules (ADC) or selectively enabled by the PCF 506/PCRF for specified Application IDs. By utilizing such policies as described herein, process 500 can facilitate a high number of flows and throughput associated with a 5G/EPC environment. An operator's business cases can also be supported without any additional overhead of clogging the N4/Sx and N7/Gx interfaces.

TABLE 1

An example of triggers, conditions, and actions for providing differential treatment to user traffic involving optimized reporting of start and stop traffic.

| Trigger | Condition | Action |
| --- | --- | --- |
| Video Stream 1 Starts | Video Flows = 1 | Send Traffic Start |
| Video Stream 2 Starts | Video Flows > 1 | No Traffic Start sent |
| . . . | . . . | . . . |
| Video Stream 1000 Starts | Video Flows > 1 | No Traffic Start sent |
| Video Stream 1 Ends | Video Flows > 1 | No Traffic Stop sent |
| Video Stream 2 Ends | Video Flows > 1 | No Traffic Start sent |
| . . . | . . . | . . . |
| Video Stream 1000 Ends | Video Flows = 0 | Send Traffic Stop |

In some implementations, N4/Sx and N7/Gx interfaces can be optimized as described herein for application reporting by utilizing policies as illustrated below in Tables 2-4.

TABLE 2

Gx Interface: Definition of Mute-Notification AVP.

| Attribute Value Pair (AVP) | Type | Value | Description |
| --- | --- | --- | --- |
| MUTE_REQUIRED | Enum | 0 | This value can be used to indicate that a PCEF will not inform a PCRF when an application's start/stop for a specific PCC rule is detected. |
| | | 1 | This value can be used to indicate that a PCEF will inform a PCRF of an application's start only on a start of a first flow and application's end only on termination of a last flow for the application. |
| | | 2 | This value can be used to indicate that a PCEF will inform a PCRF of an application's start only once on an IP flow and application's end only once on termination of the IP flow. If more than one application is detected on the same IP flow, APP_START & APP_STOP will be sent for each application detected. |

TABLE 3

N7 Interface: Definition of muteNotif AVP.

| Attribute Value Pair (AVP) | Type | Value | Description |
| --- | --- | --- | --- |
| muteNotif | boolean | 0 . . . 1 | Indicates whether an application's start or stop notification is to be muted. A default value "FALSE" will apply, if the attribute is not present and has not been supplied previously. |
| selectivemuteNotif | enum | 0 . . . 1 | Indicates whether an application's start or stop notification is to be selectively muted or to be reported once per application or once for every application per IP flow. |

TABLE 3-continued

N7 Interface: Definition of muteNotif AVP.

| Attribute Value Pair (AVP) | Type | Value | Description |
|---|---|---|---|
| | | | If present and set to 0, an SMF will inform a PCF of an application's start, only on start of a first flow, and the application's end, on termination of a last flow, for the application. If present and set to 1, an SMF will inform a PCF of an application's start only once on an IP flow and application's end only once on termination of the IP flow. If more than one application is detected on the same IP flow, APP_START & APP_STOP will be sent for each application detected. |

TABLE 4

N4/Sx Interface: Definition of Create/Update URR.

| Attribute Value Pair (AVP) | Type | Value | Description |
|---|---|---|---|
| SELECT_MUTE | enum | 0 . . . 2 | Indicates whether an application's start or stop notification is to be selectively muted. The default value "0" will apply if the attribute is not present and has not been supplied previously. If present and set to "1," a UPF/UP will inform an SMF/CP of an application's start, only on start of a first flow, and the application's end, on termination of a last flow for the application. If present and set to "2," a UPF/UP will inform an SMF/CP of an application's start only once on an IP flow and the application's end only once on termination of the IP flow. If more than one application is detected on the same IP flow, APP_START & APP_STOP will be sent for each application detected. |

In some implementations, process 500 can utilize optimized mechanisms and policies (e.g., Tables 1-4) of application detection for reporting to the PCF 506/PCRF from a user plane (e.g., UPF 502). Process 500 can also include the ability to apply differential policies on-demand without significant increases in the number of transactions on N4/Sx and N7/Gx interfaces. Process 500 can further provide a flexibility when applying mechanism and policies to application detection rules as described herein. Mechanisms and policies for the PCF 506/PCRF can also enable signaling optimization for application detection rules. Process 500 can also provide a 5G related capital expenditure ("CAPEX") reduction due to savings on compute resources for the SMF 502/CP and the PCF 506/PCRF.

Figure 6:
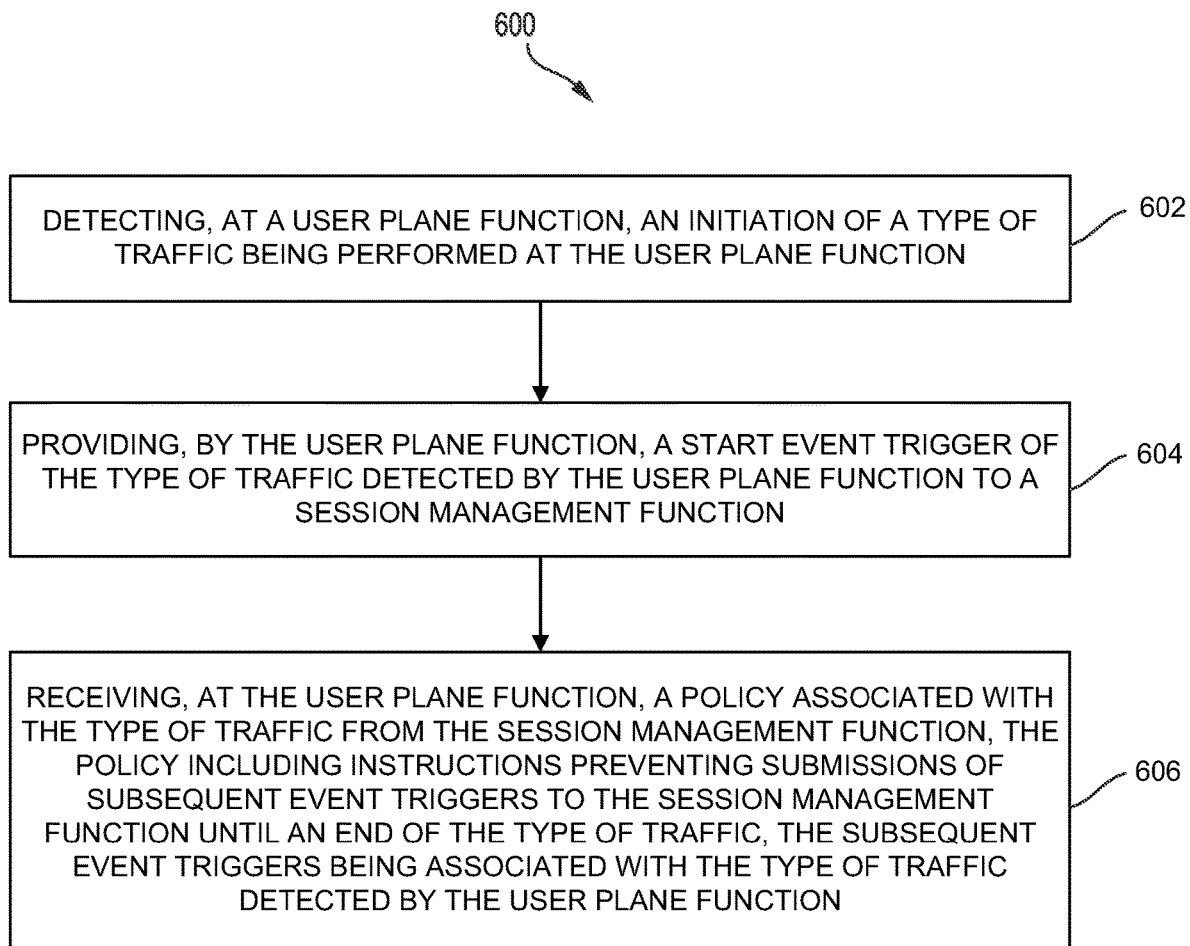
FIG. 6 illustrates an example process for providing differential treatment to user traffic involving optimized reporting of start and stop traffic, in accordance with some embodiments.

Having disclosed some example system components and concepts, the disclosure now turns to FIG. 6, which illustrate example method 600 for providing differential treatment to user traffic involving optimized reporting of start and stop traffic. The steps outlined herein are exemplary and can be implemented in any combination thereof, including combinations that exclude, add, or modify certain steps.

At step 602, the method 600 can include detecting, at a user plane function, an initiation of a type of traffic being performed at the user plane function.

At step 604, the method 600 can include providing, by the user plane function, a start event trigger of the type of traffic detected by the user plane function to a session management function. The start event trigger of the type of traffic detected by the user plane function can be provided to a policy control function via the session management function to determine the policy associated with the type of traffic.

At step 606, the method 600 can include receiving, at the user plane function, a policy associated with the type of traffic from the session management function, the policy including instructions preventing submissions of subsequent event triggers to the session management function until an end of the type of traffic, the subsequent event triggers being associated with the type of traffic detected by the user plane function. The policy associated with the type of traffic can be a packet detection rule that is installed at the session management function and initialized at the user plane function. The policy associated with the type of traffic can be determined by a policy control function.

The method 600 can further include determining, by the user plane function, the end of the type of traffic being performed at the user plane function, and providing, by the user plane function, a stop event trigger of the type of traffic detected by the user plane function based on the policy to the session management function.

The method 600 can also include receiving, at the user plane function, instructions to deactivate the policy associated with the type of traffic from the session management function after the type of traffic has ended.

The method 600 can further include informing, by the user plane function, a policy control function of a start of a first flow of the type of traffic and a termination of a last flow of the type of traffic based on the policy associated with the type of traffic.

Figure 7:
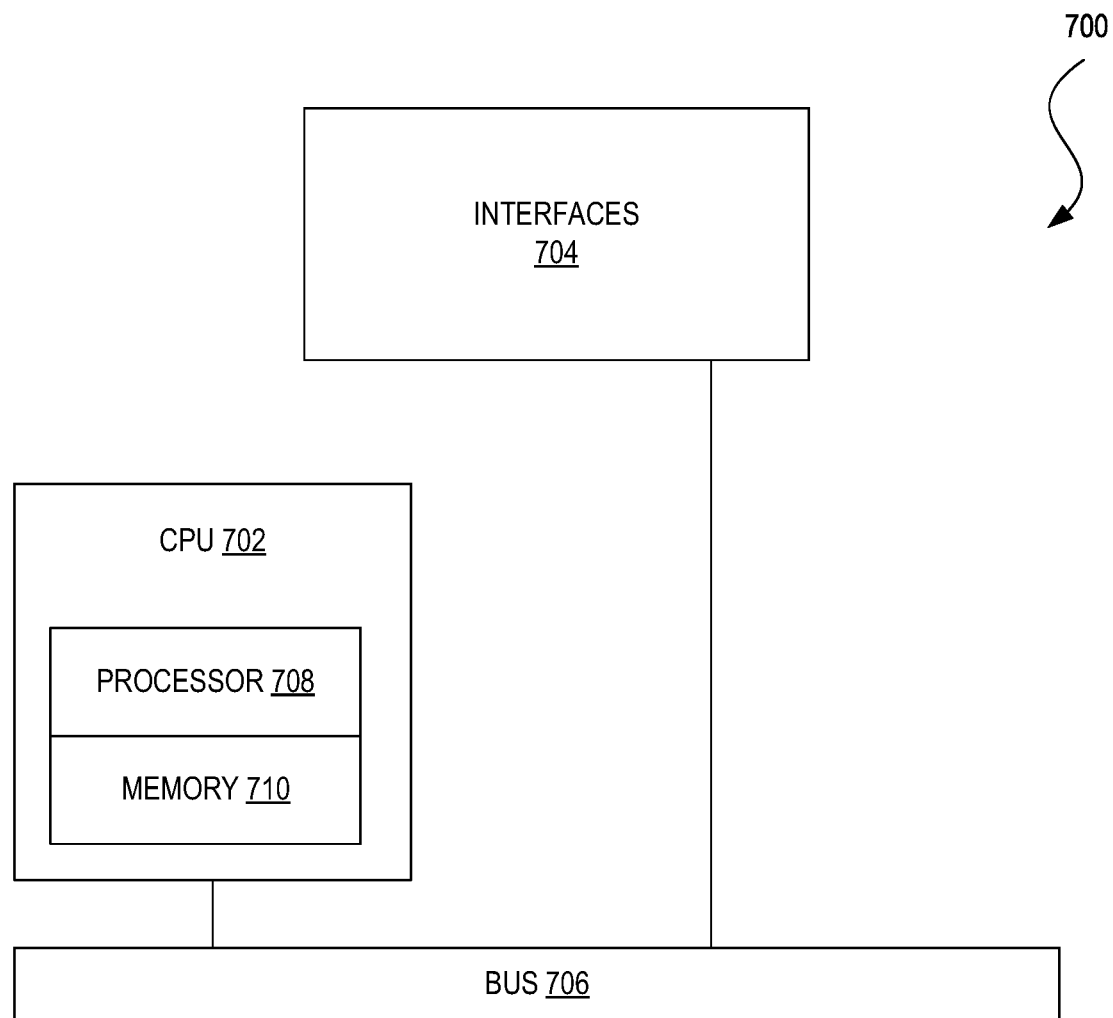
FIG. 7 illustrates an example of a network device, in accordance with some embodiments.

FIG. 7 further illustrates an example of a network device 700 (e.g., switch, router, network appliance, etc.). The network device 700 can include a master central processing unit (CPU) 702, interfaces 704, and a bus 706 (e.g., a PCI bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 710 (such as non-volatile RAM and/or ROM) can also form part of the CPU 702. However, there are many different ways in which memory could be coupled to the system.

An enterprise network can address the above and other security requirements with certain enhancements. For example, the enterprise network can create an International Mobile Subscriber Identity (IMSI) whitelist in in an Authentication, Authorization, and Accounting (AAA) server. In addition to SIM authentication, the enterprise network can maintain the AAA server containing the IMSIs of enterprise-provisioned devices. After initial authentication, a Packet Data Network Gateway (PGW) can validate the IMSI with the local device. The enterprise can also create a mapping of IMSIs to International Mobile Equipment Identities (IMEIs) for (non-embedded) SIM cards. The cloud-hosted authentication system can maintain a mapping between IMSIs and IMEIs. This mapping can be controlled by the enterprise network. This can ensure a binding between device and SIM. After authentication, the mobile core can request the IMEI. It can further check if the IMEI maps to IMSI. The enterprise network can also deploy Virtual Routing and Forwarding (VRFs) instances based on device policy. The PGW can tunnel user traffic to specific VRFs.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8A:
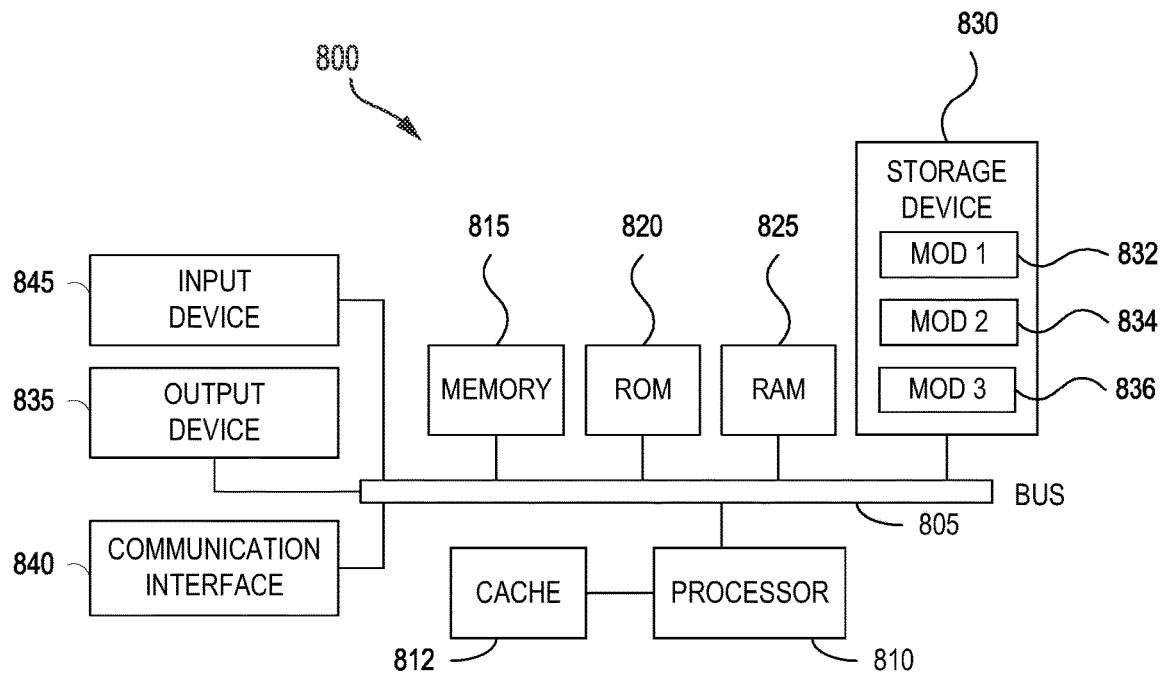
FIGS. 8A and 8B illustrate examples of systems, in accordance with some embodiments.
Figure 8B:
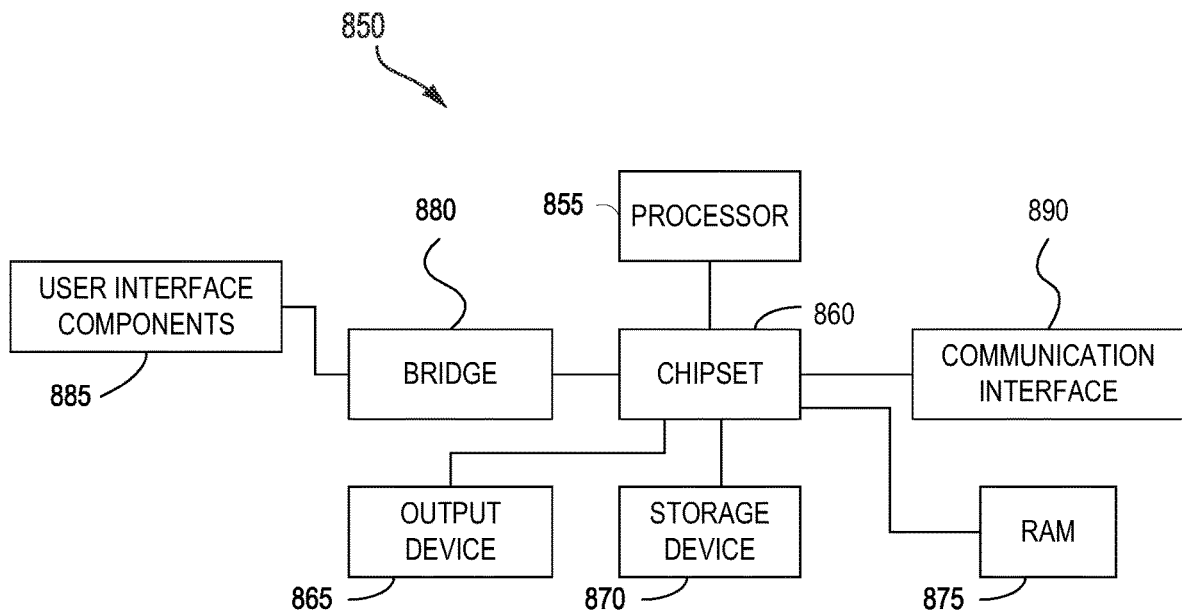

FIGS. 8A and 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

FIG. 8B illustrates an example architecture for a chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, solid state media, and other suitable storage media. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 855 analyzing data stored in the storage device 870 or the RAM 875. Further, the computing system 850 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for providing differential treatment to user traffic, the computer-implemented method comprising:
   detecting, at a user plane function, an initiation of a type of traffic being performed at the user plane function;
   providing, by the user plane function, a start event trigger of the type of traffic detected by the user plane function to a session management function; and
   receiving, at the user plane function, a policy associated with the type of traffic, the policy including instructions preventing submissions of subsequent event triggers to the session management function until an end of the type of traffic, the subsequent event triggers being associated with the type of traffic detected by the user plane function.

2. The computer-implemented method of claim 1, further comprising:
   determining, by the user plane function, the end of the type of traffic being performed at the user plane function; and
   providing, by the user plane function, a stop event trigger of the type of traffic detected by the user plane function based on the policy to the session management function.

3. The computer-implemented method of claim 1, further comprising receiving, at the user plane function, instructions to deactivate the policy associated with the type of traffic from the session management function after the type of traffic has ended.

4. The computer-implemented method of claim 1, wherein the policy associated with the type of traffic is a packet detection rule that is installed at the session management function and initialized at the user plane function.

5. The computer-implemented method of claim 1, wherein the policy associated with the type of traffic is determined by a policy control function.

6. The computer-implemented method of claim 1, further comprising informing, by the user plane function, a policy control function of a start of a first flow of the type of traffic and a termination of a last flow of the type of traffic based on the policy associated with the type of traffic.

7. The computer-implemented method of claim 1, wherein the start event trigger of the type of traffic detected by the user plane function is provided to a policy control function via the session management function to determine the policy associated with the type of traffic.

8. A system for providing differential treatment to user traffic, the system comprising:
   one or more processors; and
   at least one computer-readable storage medium having stored therein instructions which, when executed by the one or more processors, cause the system to:
      detect, at a user plane function, an initiation of a type of traffic being performed at the user plane function;
      provide, by the user plane function, a start event trigger of the type of traffic detected by the user plane function to a session management function; and
      receive, at the user plane function, a policy associated with the type of traffic, the policy including instructions preventing submissions of subsequent event triggers to the session management function until an end of the type of traffic, the subsequent event triggers being associated with the type of traffic detected by the user plane function.

9. The system of claim 8, wherein the instructions which, when executed by the one or more processors, cause the system to:
   determine, by the user plane function, the end of the type of traffic being performed at the user plane function; and
   provide, by the user plane function, a stop event trigger of the type of traffic detected by the user plane function based on the policy to the session management function.

10. The system of claim 8, wherein the instructions which, when executed by the one or more processors, cause the system to receive, at the user plane function, instructions to deactivate the policy associated with the type of traffic from the session management function after the type of traffic has ended.

11. The system of claim 8, wherein the policy associated with the type of traffic is a packet detection rule that is installed at the session management function and initialized at the user plane function.

12. The system of claim 8, wherein the policy associated with the type of traffic is determined by a policy control function.

13. The system of claim 8, wherein the instructions which, when executed by the one or more processors, cause the system to inform, by the user plane function, a policy control function of a start of a first flow of the type of traffic and a termination of a last flow of the type of traffic based on the policy associated with the type of traffic.

14. The system of claim 8, wherein the start event trigger of the type of traffic detected by the user plane function is provided to a policy control function via the session management function to determine the policy associated with the type of traffic.

15. A non-transitory computer-readable storage medium comprising:
   instructions stored on the non-transitory computer-readable storage medium, the instructions, when executed by one or more processors, cause the one or more processors to:
      detect, at a user plane function, an initiation of a type of traffic being performed at the user plane function;
      provide, by the user plane function, a start event trigger of the type of traffic detected by the user plane function to a session management function; and
      receive, at the user plane function, a policy associated with the type of traffic, the policy including instructions preventing submissions of subsequent event triggers to the session management function until an end of the type of traffic, the subsequent event triggers being associated with the type of traffic detected by the user plane function.

16. The non-transitory computer-readable storage medium of claim 15, wherein the instructions, when executed by the one or more processors, cause the one or more processors to:
   determine, by the user plane function, the end of the type of traffic being performed at the user plane function; and
   provide, by the user plane function, a stop event trigger of the type of traffic detected by the user plane function based on the policy to the session management function.

17. The non-transitory computer-readable storage medium of claim 15, wherein the instructions, when executed by the one or more processors, cause the one or more processors to receive, at the user plane function, instructions to deactivate the policy associated with the type of traffic from the session management function after the type of traffic has ended.

18. The non-transitory computer-readable storage medium of claim 15, wherein the policy associated with the type of traffic is a packet detection rule that is installed at the session management function and initialized at the user plane function.

19. The non-transitory computer-readable storage medium of claim 15, wherein the policy associated with the type of traffic is determined by a policy control function.

20. The non-transitory computer-readable storage medium of claim 15, wherein the instructions, when executed by the one or more processors, cause the one or more processors to inform, by the user plane function, a policy control function of a start of a first flow of the type of traffic and a termination of a last flow of the type of traffic based on the policy associated with the type of traffic.

* * * * *